(12) United States Patent
Nakamura et al.

(10) Patent No.: US 11,741,097 B2
(45) Date of Patent: Aug. 29, 2023

(54) TREE STRUCTURE DATA PROCESSING SYSTEM, TREE STRUCTURE DATA PROCESSING METHOD, TREE STRUCTURE DATA PROCESSING DEVICE, AND TREE STRUCTURE DATA PROCESSING PROGRAM

(71) Applicant: Nippon Telegraph and Telephone Corporation, Tokyo (JP)

(72) Inventors: Tetsuro Nakamura, Musashino (JP); Naoki Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 79 days.

(21) Appl. No.: 17/441,026

(22) PCT Filed: Apr. 3, 2020

(86) PCT No.: PCT/JP2020/015276
§ 371 (c)(1),
(2) Date: Sep. 20, 2021

(87) PCT Pub. No.: WO2020/213428
PCT Pub. Date: Oct. 22, 2020

(65) Prior Publication Data
US 2022/0156258 A1 May 19, 2022

(30) Foreign Application Priority Data
Apr. 15, 2019 (JP) .................................. 2019-076747

(51) Int. Cl.
*G06F 16/00* (2019.01)
*G06F 16/2453* (2019.01)
(Continued)

(52) U.S. Cl.
CPC ...... *G06F 16/2453* (2019.01); *G06F 11/3409* (2013.01); *G06F 16/2246* (2019.01); *G06F 16/2343* (2019.01); *G06F 16/27* (2019.01)

(58) Field of Classification Search
CPC .. G06F 16/2453; G06F 16/27; G06F 16/2246; G06F 16/2343
See application file for complete search history.

(56) References Cited

U.S. PATENT DOCUMENTS 11,481,370 B1 * 10/2022 Snider ................. G06F 16/2379
2007/0208693 A1 * 9/2007 Chang ...................... G06F 16/20
(Continued)

OTHER PUBLICATIONS

Celko, "SQL Graph Principles for Programmers," Shoeisha Co. Ltd., Aug. 2016, Chapters 2 and 4, 19 pages (with English translation).

*Primary Examiner* — Khanh B Pham
(74) *Attorney, Agent, or Firm* — Fish & Richardson P.C.

(57) ABSTRACT

[Problem] In reconfiguration of a tree structure in a relational database, to reduce a service response-disabled time by an update lock, and to maintain data retrieving and reading performance without deterioration.
[Solution] A tree structure data processing device 10 of a tree structure data processing system 1000 includes a process thread setting unit and a synchronization state management unit. The process thread setting unit starts and performs a request process thread for retrieval processing with reference to a nested set data table and starts and performs a request process thread 150 for updating data of a naive tree data table. The synchronization state management unit switches a state of the request process thread 150 to a synchronization waiting state when receiving synchronization waiting instruction information indicating start of a synchronization process between the naive tree data table and the nested set data table. A synchronization device (Continued)

includes a synchronization processing unit that converts data of the naive tree data table updated in response to an update request into data of the nested set data table to perform synchronization.

4 Claims, 13 Drawing Sheets

(51) Int. Cl.
  *G06F 16/27* (2019.01)
  *G06F 16/22* (2019.01)
  *G06F 16/23* (2019.01)
  *G06F 11/34* (2006.01)

(56) References Cited

U.S. PATENT DOCUMENTS

| | | | |
|---|---|---|---|
| 2018/0322157 A1* | 11/2018 | Lee | G06F 11/2094 |
| 2019/0377801 A1* | 12/2019 | McKee | G06F 16/86 |
| 2020/0034365 A1* | 1/2020 | Martin | G06F 16/24554 |

* cited by examiner

TREE STRUCTURE DATA PROCESSING SYSTEM, TREE STRUCTURE DATA PROCESSING METHOD, TREE STRUCTURE DATA PROCESSING DEVICE, AND TREE STRUCTURE DATA PROCESSING PROGRAM

CROSS-REFERENCE TO RELATED APPLICATIONS

This application is a National Stage application under 35 U.S.C. § 371 of International Application No. PCT/JP2020/015276, having an International Filing Date of Apr. 3, 2020, which claims priority to Japanese Application Serial No. 2019-076747, filed on Apr. 15, 2019. The disclosure of the prior application is considered part of the disclosure of this application, and is incorporated in its entirety into this application.

TECHNICAL FIELD

The present invention relates to a tree structure data processing system, a tree structure data processing method, a tree structure data processing device, and a tree structure data processing program storing data with a tree structure in a relational database.

BACKGROUND ART

A tree structure is known as a kind of data structure that has a hierarchical structure. For example, various kinds of data such as an organization structure of a company illustrated in FIG. 10, a parent-child relation of a ticket (a record of content, priority, or the like of work to be performed) in a work progress management system, a response comment to a received comment in SNS, capacity management of physical resources (configurations of computer hosts-CPU sockets-CPU, memories, and the like) has a tree structure.

As schemes for modeling data with a tree structure to a relational database (hereinafter simply referred to as a "database"), a "naive tree scheme" and a "nested set scheme" are known (see Non Patent Literature 1).

The naive tree scheme will be described as a case in which data has a tree structure denoted by reference numeral 100 in FIG. 11. In the tree structure denoted by reference numeral 100, data is disposed such that one piece of data belonging to a certain class is branched into data located in lower classes. Elements in the tree structure are called joints (hereinafter referred to as "nodes") on which individual pieces of data are disposed. In the tree structure, data associated with nodes A, B, C, D, E, and F is disposed. Here, IDs of the nodes are called "A", "B", "C", "D", "E", and "F". The naive tree scheme is a simple model in which an ID of a node (parent) located in an immediately upper layer is stored as a pointer as information indicating the hierarchical structure to correspond to the ID of each node, as indicated by reference numeral 310, when data with the tree structure denoted by reference numeral 100 is stored in a database. A data table indicated as an example of reference numeral 310 is referred to as a "data table of a naive tree scheme" or a "naive tree data table". For example, a node "A" is stored as a parent ID (Parent_ID) corresponding to ID "B" of a node (hereinafter simply referred to as a node "B", and the same applies to the other nodes). In addition, a node "B" is stored as a parent ID (Patent_ID) corresponding to a node "D".

The problem arising upon adopting the naive tree scheme as a model of a tree structure database is that performance easily deteriorates because a procedure is called to search for all the tree data and therefore a plurality of queries is generated in a database. For example, in the case of data with the tree structure denoted by 100 in FIG. 11, in order to extract all the data in the tree structure, it is necessary to perform recursive searching a plurality of times or combine recursive tables as described below.

```
SELECT id WHERE parent__id = A: -- return B and C
SELECT id WHERE parent__id = B: -- return D and E
SELECT id WHERE parent__id = C: -- return F
SELECT id WHERE parent__id = D: -- return nothing
SELECT id WHERE parent__id = E: -- return nothing
SELECT id WHERE parent__id = F: -- return nothing
```

On the other hand, in the nested set scheme, after the tree structure is redefined as a nested structure, a root for returning to a root node is searched by circulating the nodes in order from a root node (a top node) to lower nodes in a unicursal manner. At this time, consecutive numbers are assigned as left and right ends upon entering and leaving each node. For example, in the case of the data with the tree structure denoted by reference numeral 101 in FIG. 12, numbers are assigned to the left and right ends of each node while searching for a route for circulating the nodes from the node "A" which is the root node to the lower nodes and returning to the node "A". As indicated by reference numeral 320 in FIG. 12, the left end of the node "A" is set to "1", the right end of the node "A" is set to "12", the left end of the node "B" is set to "2", and the right end of the node "B" is set to "7", for example. Note that the data table indicated as an example of reference numeral 320 is referred to as a "data table in a nested set scheme" or a "nested set data table".

The problem arising upon adopting the nested set scheme as a model of a tree structure database is that performance easily deteriorates due to a contention lock during updating because many columns are updated when the tree structure is changed. For example, a case of changing the tree structure denoted by reference numeral 103 in FIG. 13 to the tree structure denoted by reference numeral 104 is considered. At this time, in the data stored in the database in the naive tree scheme (a naive tree data table denoted by reference numeral 310), information (parent ID) of only the node "B" is required to be changed to "A" to "C" after the change, as indicated by a broken line of a naive tree data table denoted by reference numeral 311. In the nested set scheme, on the other hand, as the data before the change (nested set data table denoted by reference numeral 320) shown in a nested set data table denoted by reference numeral 321, it is necessary to change information regarding the left and right ends of the nodes "B", "C", "D", and "E". Consequently, data to be updated increase.

CITATION LIST

Non Patent Literature

Non Patent Literature 1: Joe Celko's "SQL for Smarties", Shoeisha Co., Ltd. p. 13 to 15, 26, 27, 61 to 63, 98 to 101, and 114 to 116, August 2016

SUMMARY OF THE INVENTION

Technical Problem

When the models of the databases for the naive tree scheme and the nested set scheme are compared, the naive tree scheme has more excellent processing performance in update writing of data that reconfigures the tree structure (reconfiguration of the tree structure), but has poorer processing performance for searching and reading data than the nested set scheme. In contrast, the nested set scheme has excellent searching and reading performance and poor update writing (reconfiguration of the tree structure) performance.

The present invention has been made in view of such circumstances and an objective of the present invention is to provide a tree structure data processing system, a tree structure data processing method, a tree structure data processing device, and a tree structure data processing program capable of reducing a service response-disabled time by an update lock maintaining data searching and reading performance without deterioration in reconfiguration of a tree structure in a relational database.

Means for Solving the Problem

To achieve the above-described objective, the invention according to a first aspect, is a tree structure data processing system including a DB server configured to store, in a data table, tree structure data in a relational database, a tree structure data processing device configured to control updating and retrieving the tree structure data, and a synchronization device configured to synchronize a plurality of the data tables stored in the DB server with each other. The DB server includes a storage unit that stores, as a data table for one service, a naive tree data table indicating a data table obtained by modeling the tree structure data in conformity with a naive tree scheme and a nested set data table indicating a data table obtained by modeling the tree structure data in conformity with a nested set scheme in association with each other. The tree structure data processing device includes a request reception unit that receives an update request and a retrieval request for the tree structure data, a process thread setting unit that starts and performs a request process thread for retrieval processing with reference to the nested set data table when the retrieval request is received, and starts and performs a request process thread for updating data of the naive tree data table when the update request is received, and a synchronization state management unit that switches a state of each of the request process threads to a synchronization waiting state when synchronization waiting instruction information indicating start of a synchronization process between the naive tree data table and the nested set data table is received. The synchronization device includes a synchronization waiting instruction unit that transmits the synchronization waiting instruction information to the tree structure data processing device when information indicating update completion of the naive tree data table is received from the DB server, and a synchronization processing unit that converts data of the naive tree data table updated in response to the update request into data of the nested set data table to perform synchronization. In the tree structure data processing device, the process thread setting unit performs a retrieval process with reference to the naive tree data table instead of the nested set data table when the request process thread is in the synchronization waiting state and when the request reception unit receives the retrieval request for the tree structure data.

The invention according to a second aspect is a tree structure data processing method of a tree structure data processing system including a DB server that stores, in a data table, tree structure data in a relational database, a tree structure data processing device that control updating and retrieving the tree structure data, and a synchronization device that synchronizes a plurality of the data tables stored in the DB server with each other. The DB server stores, as a data table for one service, a naive tree data table indicating a data table obtained by modeling the tree structure data in conformity with a naive tree scheme and a nested set data table indicating a data table obtained by modeling the tree structure data in conformity with a nested set scheme in association with each other. The tree structure data processing device performs receiving an update request and a retrieval request for the tree structure data, initializing and performing a request process thread for a retrieval process with reference to the nested set data table when the retrieval request is received, and starts and performs a request process thread for updating data of the naive tree data table when the update request is received, and switching a state of each of the request process thread to a synchronization waiting state when synchronization waiting instruction information indicating start of a synchronization process between the naive tree data table and the nested set data table is received. The synchronization device performs transmitting the synchronization waiting instruction information to the tree structure data processing device when information indicating update completion of the naive tree data table is received from the DB server, and converting data of the naive tree data table updated in response to the update request into data of the nested set data table to perform synchronization. The tree structure data processing device performs a retrieval process with reference to the naive tree data table instead of the nested set data table when the request process thread is in the synchronization waiting state and when the retrieval request for the tree structure data is received.

The invention according to a third aspect is a tree structure data processing device is communicatively connected to a DB server configured to store, in a data table, tree structure data in a relational database and a synchronization device configured to synchronize a plurality of the data tables stored in the DB server, and the tree structure data processing device controls control updating and retrieving the tree structure data. The DB server stores, as a data table for one service, a naive tree data table indicating a data table obtained by modeling the tree structure data in conformity with a naive tree scheme and a nested set data table indicating a data table obtained by modeling the tree structure data in conformity with a nested set scheme in association with each other. The tree structure data processing device includes a request reception unit that receives an update request and a retrieval request for the tree structure data, a process thread setting unit that starts and performs a request process thread for retrieval processing with reference to the nested set data table when the retrieval request is received, and that starts and performs a request process thread for updating data of the naive tree data table when the update request is received, and a synchronization state management unit that switches a state of the request process thread to a synchronization waiting state when synchronization waiting instruction information indicating start of a synchronization process between the naive tree data table and the nested set data table is received from the synchronization device. In the tree structure data processing device, the process thread setting unit performs a retrieval process with reference to the naive tree data table instead of the nested set data table when the request process thread is in the synchronization waiting state and when the request reception unit receives the retrieval request for the tree structure data.

The invention according to a fourth aspect is a tree structure data processing program causing a computer to function as the tree structure data processing device according to the third aspect.

Thus, when receiving a data retrieval request, the tree structure data processing device of the tree structure data processing system performs the retrieval process using the nested set data table that has excellent retrieval process performance. In addition, when receiving the data update request (update writing (reconfiguration of the tree structure)), the tree structure data processing device performs data update in the naive tree data table that has excellent update processing performance, and thus the naive tree data table and the nested set data table can be synchronized by the synchronization device. Further, the tree structure data processing device can perform the retrieval process with reference to the naive tree data table instead of the nested set data table when receiving a retrieval request in a case in which the nested set data table is being synchronized and each request process thread is in a synchronization waiting state. Accordingly, a service response time by an update lock can be reduced and data searching and reading performance can be maintained without deterioration in reconfiguration (an update request) of a tree structure.

Effects of the Invention

According to the present invention, it is possible to provide a tree structure data processing system, a tree structure data processing method, a tree structure data processing device, and a tree structure data processing program capable of reducing a service response-disabled time by an update lock and maintaining data searching and reading performance without deterioration in reconfiguration of a tree structure in a relational database.

DESCRIPTION OF EMBODIMENTS

Figure 1:
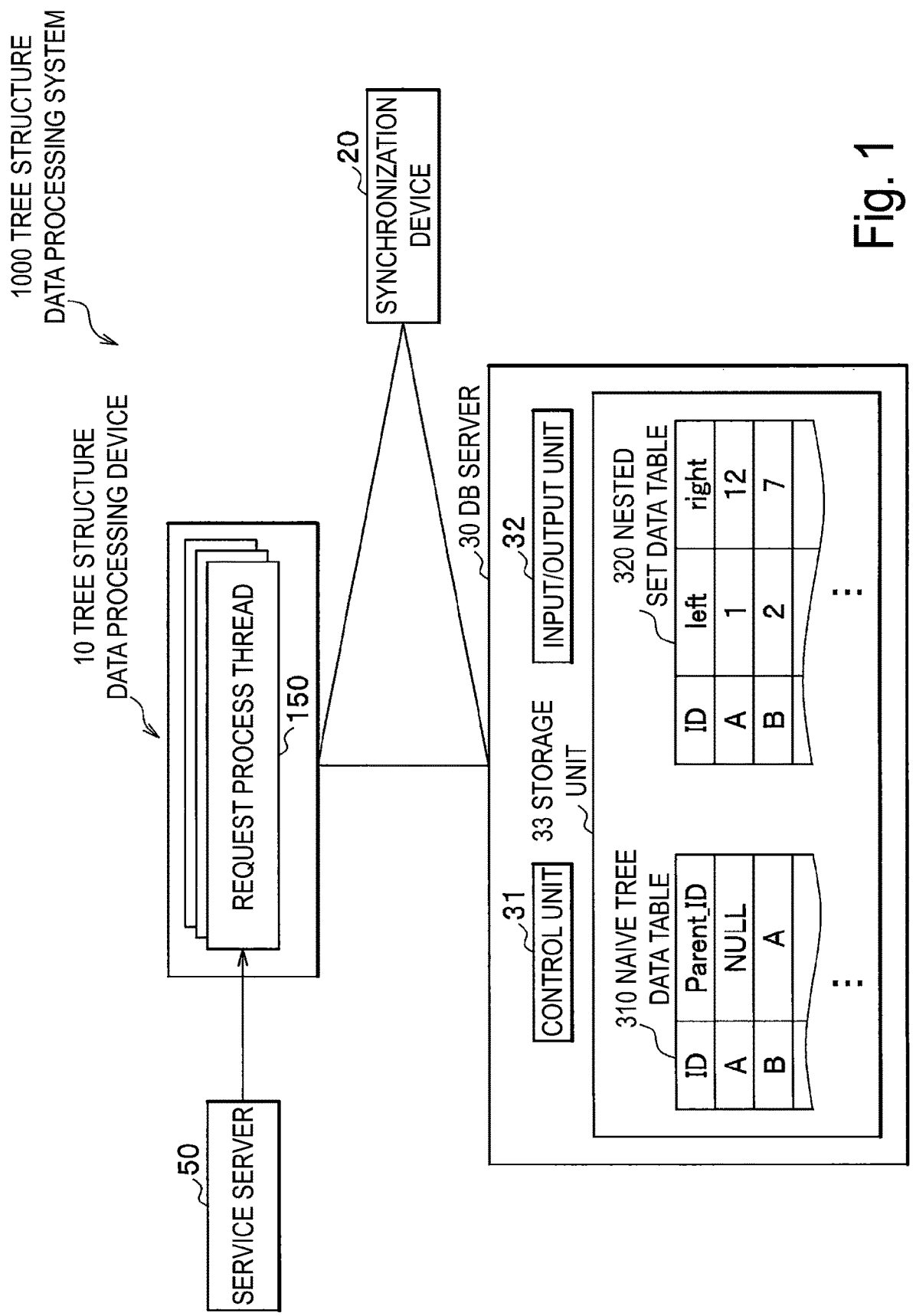
FIG. 1 is a diagram illustrating an overall configuration of a tree structure data processing system according to an embodiment.

Next, a mode for carrying out the present invention (hereinafter referred to as the present embodiment) will be described. First, an overview of a tree structure data processing system and the like according to the embodiment will be described. FIG. 1 is a diagram illustrating an overall configuration of a tree structure data processing system 1000 according to an embodiment. As illustrated in FIG. 1, the tree structure data processing system 1000 includes a tree structure data processing device 10 connected to communicate with a service server 50, a synchronization device 20, and a DB server 30.

The DB server 30 includes a data table of a naive tree scheme (a naive tree data table 310) and a data table of a nested set scheme (a nested set data table 320) for one service. The synchronization device 20 causes the naive tree data table 310 and the nested set data table 320 to be synchronized with each other.

Figure 2:
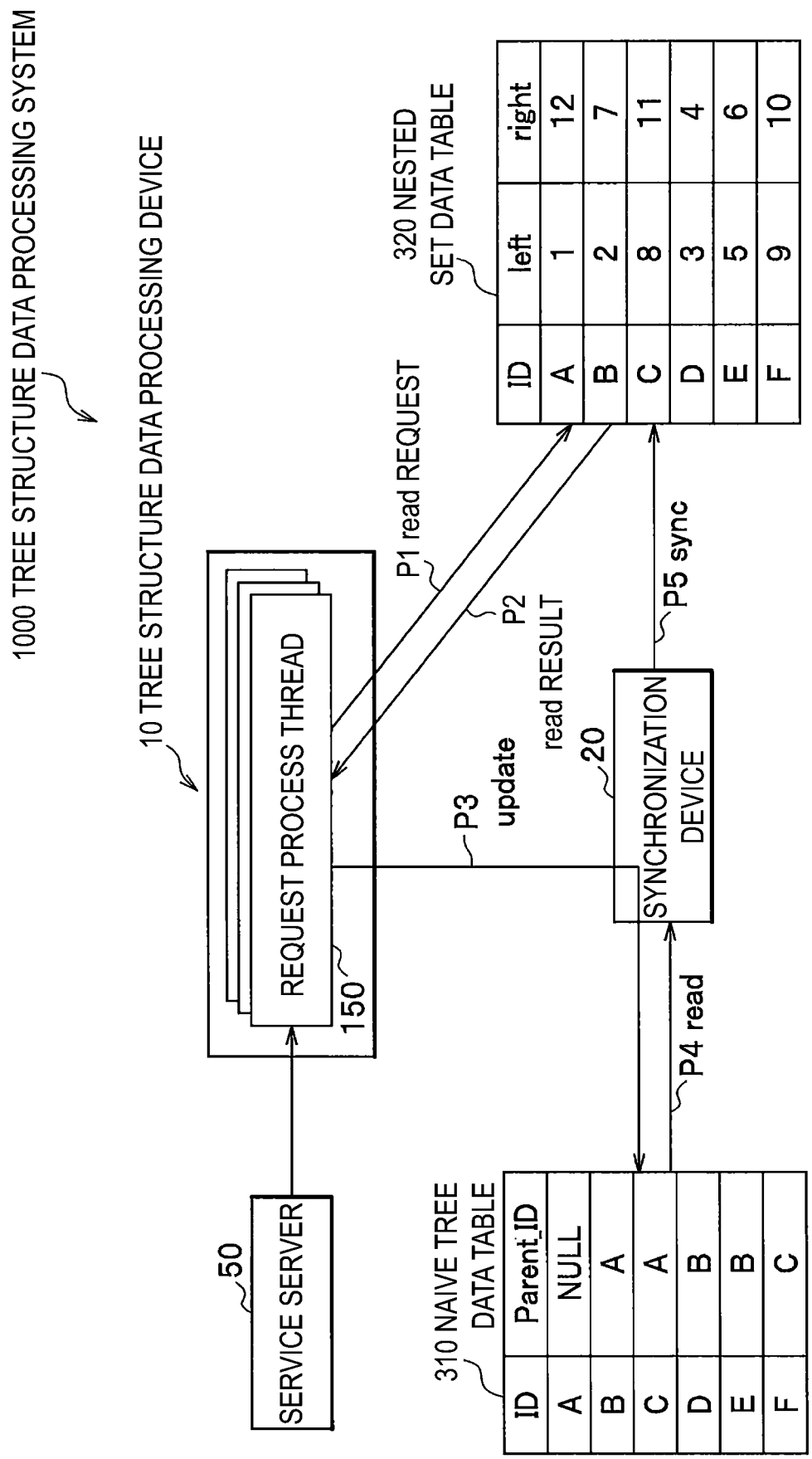
FIG. 2 is a diagram illustrating an overview of a process of the tree structure data processing system according to the embodiment.

FIG. 2 is a diagram illustrating an overview of a process of the tree structure data processing system 1000 according to the embodiment. In FIG. 2, to facilitate description of processing content, the DB server 30 (see FIG. 1) serving as a casing will not be described and extraction of the naive tree data table 310 and the nested set data table 320 stored in the DB server 30 will be described (the same applies to subsequent drawings).

When receiving a data retrieval and read request from the service server 50, the tree structure data processing device 10 starts a thread for processing the read request (hereinafter referred to as a "request process thread 150"). The tree structure data processing device 10 reads data by transmitting a read request to the nested set data table 320 (reference numeral P1) and receiving a response (a read result) (reference numeral P2). When receiving a data update request from the service server 50, the tree structure data processing device 10 starts a thread for processing the update request (a request process thread 150). The tree structure data processing device 10 updates the naive tree data table 310 via the synchronization device 20 based on the update request (reference numeral P3). After the updating of the naive tree data table 310 ends, the synchronization device 20 reads the naive tree data table 310 in the background (reference numeral P4) and converts the naive tree data table 310 into information regarding the nested set data table 320 for synchronization (sync) (reference numeral P5).

In this way, when receiving the data retrieval and read request, the tree structure data processing device 10 accesses the nested set data table 320 with excellent read processing performance. When receiving the data update request (update writing (reconfiguration of the tree structure)), the tree structure data processing device 10 accesses the naive tree data table 310 with excellent update processing performance. Accordingly, in the tree structure data processing system 1000, a service response time by an update lock can be reduced in reconfiguration (in an update request) of the tree structure and a data retrieval and read function can be maintained without deterioration. Hereinafter, each device included in the tree structure data processing system 1000 will be described in detail.

Tree Structure Data Processing Device

The tree structure data processing device 10 receives a query from the service server 50. Here, a query for the read request and an update request is assumed to be received with regard to a data table corresponding to a certain service. When receiving the query, the tree structure data processing device 10 makes a thread (the request process thread 150) and registers the request process thread 150 in the synchronization device 20. The tree structure data processing device 10 determines one of the naive tree data table 310 and the nested set data table 320 stored in the DB server 30 (see FIG. 1) based on content of the query as a request destination and performs a process for each request process thread 150.

When receiving the read request at normal times, the tree structure data processing device 10 transmits the read request to the nested set data table 320. On the other hand, when receiving the update request, the tree structure data processing device 10 transmits the update request to the naive tree data table 310 via the synchronization device 20. Here, in a case in which the nested set data table 320 is being synchronized (in "synchronization waiting switching" to be described below), when receiving the read request, the tree structure data processing device 10 performs control such that the read request is transmitted to the naive tree data table 310 Thus, the tree structure data processing device 10 can achieve high retrieval performance at normal times while reducing a time in which a service non-response time occurs due to a contention lock.

Figure 3:
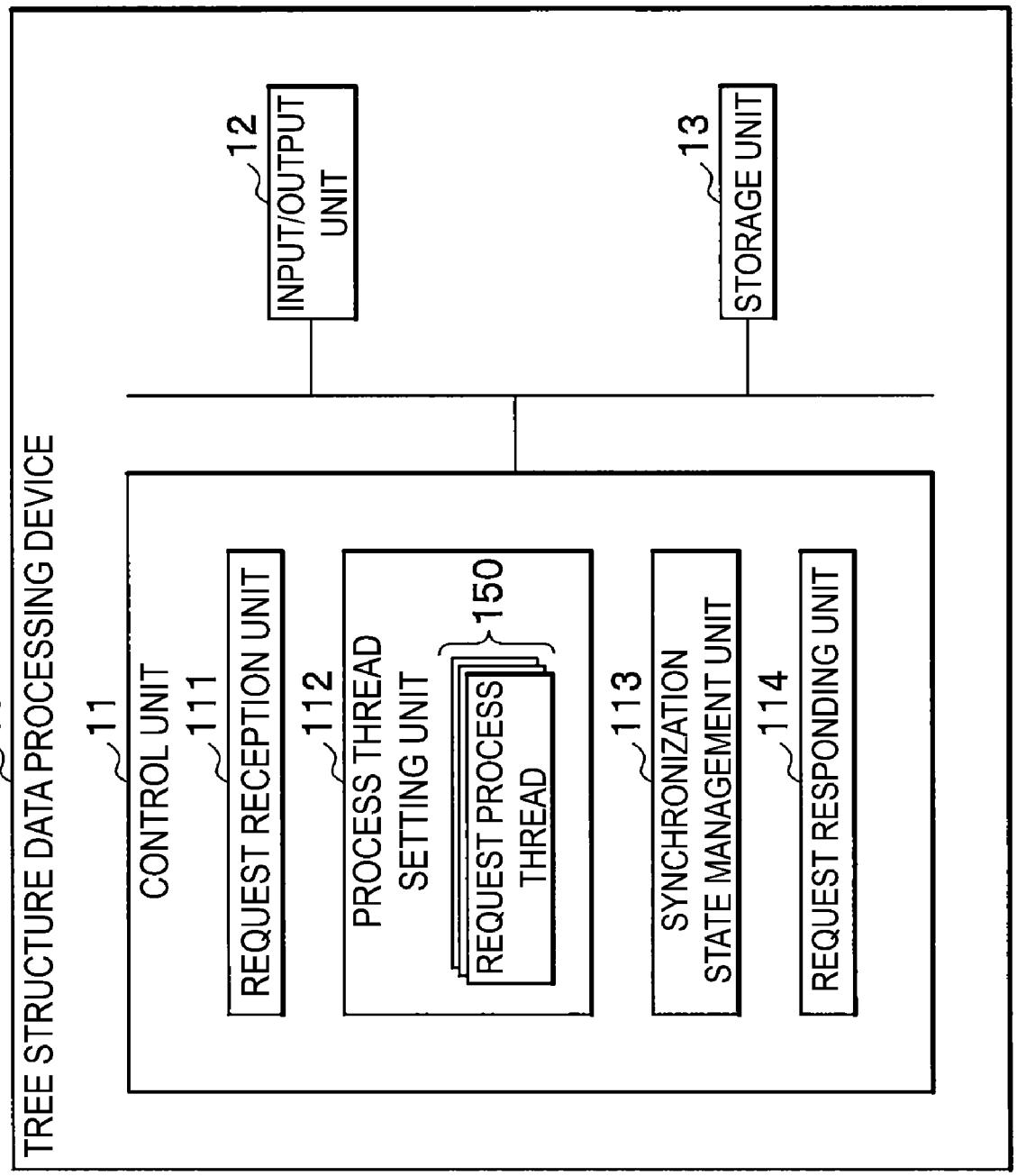
FIG. 3 is a functional block diagram illustrating a configuration example of a tree structure data processing device according to the embodiment.

FIG. 3 is a functional block diagram illustrating a configuration example of the tree structure data processing device 10 according to the embodiment. As illustrated in FIG. 3, the tree structure data processing device 10 is realized by a computer or the like including a control unit 11, an input/output unit 12, and a storage unit 13. The input/output unit 12 is formed by a communication interface that transmits and receives information and an input/output interface that transmits and receives information to and from an input device such as a keyboard or an output device such as a monitor. The storage unit 13 is formed by a flash memory, a hard disk, a random access memory (RAM), or the like. The storage unit 13 temporarily stores a program for causing each function of the control unit 11 to be performed (a tree structure data processing program) or information necessary for a process of the control unit 11.

As illustrated in FIG. 3, the control unit 11 includes a request reception unit 111, a process thread setting unit 112, a synchronization state management unit 113, and a request responding unit 114. The control unit 11 is realized, for example, by causing a central processing unit (CPU) (not illustrated) to load a program stored in the storage unit 13 in the RAM and execute the program.

The request reception unit 111 receives a query from the service server 50. Here, the query received by the request reception unit 111 is information indicated by an abstract request for giving an instruction regarding a read request or an update request. The request reception unit 111 outputs a query indicating a received abstract read request or abstract update request to the process thread setting unit 112. The abstract read request or the abstract update request is set so that pre-defined information (a protocol) can be used between the service server 50 and the tree structure data processing device 10.

The process thread setting unit 112 starts a thread (the request process thread 150) when acquiring the query. Then, the process thread setting unit 112 allows registration by transmitting information regarding an identifier (identification information) of the started request process thread 150 to the synchronization device 20. The process thread setting unit 112 determines request content such as whether the content of the acquired query is the read request or the update request.

Then, when the query is the update request, the process thread setting unit 112 updates the naive tree data table 310 by performing conversion into a structured query language (SQL) for a naive tree to transmit the update request to the synchronization device 20 as the process of the started request process thread 150.

For example, in the naive tree data table 310 illustrated in FIG. 2, when a parent ID (Parent_ID) of the node "B" is converted into "C", the abstract update request is converted into the following SQL statement:

UPDATE<NAIVE_TABLE>SET parent_id=C WHERE id=B

At normal times (when the nested set data table 320 is not being synchronized) when the content of the acquired query is the read request, the process thread setting unit 112 converts the (abstract) read request into a recursive SQL for a nested set and transmits a read request (read) to the nested set data table 320.

For example, when all the nodes lower than the node A are retrieved in the nested set data table 320 illustrated in FIG. 2, the abstract read request is converted into the following recursive SQL:

```
- SELECT naive.id FROM <NESTED_SET_TABLE>
  AS naive WHERE A. left <= naive.left
  AND naive.right <= A.right
```

On the other hand, in the synchronization waiting of the nested set data table 320 when the content of the acquired query is the read request, the process thread setting unit 112 converts the (abstract) read request into a recursive SQL for a naive tree and transmits a read request (read) to the naive tree data table 310.

For example, when all the nodes lower than the node A are retrieved in the naive tree data table 310 illustrated in FIG. 2, the abstract read request is converted into the following recursive SQL:

```
-WITH RECURSIVE sub_tree(id, parend_id) AS
(
SELECT naive.id AS id, naive.parent_id AS parent_id FROM <NAIVE_TABLE> AS naive
WHERE naive.id = A UNION ALL
SELECT naive_alias.id AS naive_alias_id, naive_alias. parent_id AS naive_alias_parent_id
FROM <NAIVE_TABLE> AS naive_alias, sub_tree AS subtree_alias WHERE naive_alias.
parent_id = subtree_alias.id
)
SELECT sub_tree.id FROM sub_tree
```

The process thread setting unit 112 can ascertain whether the nested set data table 320 is being synchronized by setting (an instruction of "synchronization waiting") of the synchronization state management unit 113. The process thread setting unit 112 allows deletion of the registered identifier by transmitting the identifier of the ended request process thread 150 to the synchronization device 20 when the process of each request process thread 150 ends.

The synchronization state management unit 113 switches the states of all the request process threads 150 from "normal" (a state in which the synchronization is not awaited) to "synchronization waiting" by receiving synchronization waiting instruction information for each request process thread 150 which is currently being performed in synchronization start of the nested set data table 320 from the synchronization device 20. The synchronization state management unit 113 switches the states of all the request process threads 150 from "synchronization waiting" to "normal" (a state in which the synchronization is not awaited) by receiving a synchronization completion notification indicating synchronization completion of the nested set data table 320 with regard to each request process thread 150 which is currently being performed from the synchronization device 20.

The request responding unit 114 transmits result information of the read request or the update request processed by each request process thread 150 to the service server 50.

Synchronization Device

The synchronization device 20 performs an update request in the naive tree data table 310 based on an instruction of the tree structure data processing device 10. The synchronization device 20 performs a synchronization process of causing the updated naive tree data table 310 to synchronize with the nested set data table 320.

Figure 4:
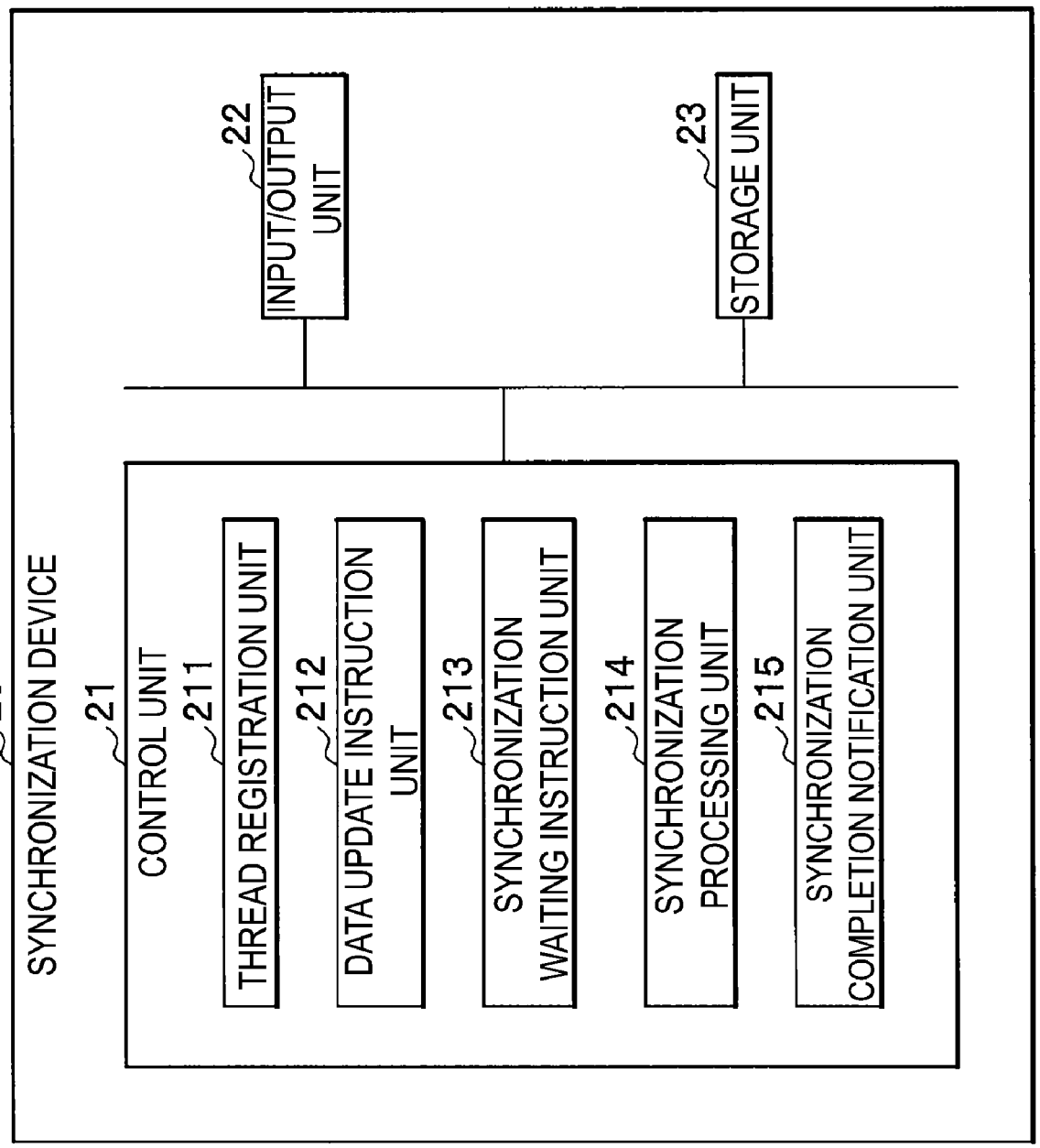
FIG. 4 is a functional block diagram illustrating a configuration example of a synchronization device according to the embodiment.

FIG. 4 is a functional block diagram illustrating a configuration example of the synchronization device 20 according to the embodiment. As illustrated in FIG. 4, the synchronization device 20 is realized by a computer or the like including a control unit 21, an input/output unit 22, and a storage unit 23. The input/output unit 22 is formed by a communication interface that transmits and receives information and an input/output interface that transmits and receives information to and from an input device such as a keyboard or an output device such as a monitor. The storage unit 23 is formed by a flash memory, a hard disk, a RAM, or the like. The storage unit 23 temporarily stores a program for performing each function of the control unit 21 or, for example, identification information of a thread (a request process thread 150) as information necessary for a process of the control unit 21.

As illustrated in FIG. 4, the control unit 21 includes a thread registration unit 211, a data update instruction unit 212, a synchronization waiting instruction unit 213, a synchronization processing unit 214, and a synchronization completion notification unit 215. The control unit 21 is realized, for example, by causing a CPU (not illustrated) to load a program stored in the storage unit 23 in the RAM and execute the program.

The thread registration unit 211 acquires identification information (an identifier) of the request process thread 150 from the tree structure data processing device 10 and stores the identification information in the storage unit 23. Thus, the thread registration unit 211 registers a thread (the request process thread 150) which is currently being processed. The thread registration unit 211 deletes the identification information of the registered request process thread 150 when receiving identification information (an identifier) of the request process thread 150 of which the process has ended from the synchronization device 20.

When receiving an update request (an SQL for a native tree) for the naive tree data table 310 from the tree structure data processing device 10, the data update instruction unit 212 updates the naive tree data table 310 by transmitting the update request to the DB server 30 (see FIG. 1).

The synchronization waiting instruction unit 213 receives information regarding update completion of the naive tree data table 310 from the DB server 30 (see FIG. 1). Then, the synchronization waiting instruction unit 213 generates synchronization waiting instruction information regarding each request process thread 150 with reference to identification information (an identifier) of each request process thread 150 registered in the storage unit 23 using the reception of the update completion as a trigger, and transmits the synchronization waiting instruction information to the tree structure data processing device 10.

The synchronization processing unit 214 reads information regarding the naive tree data table 310 using the transmission of the synchronization waiting instruction information to the tree structure data processing device 10 by the synchronization waiting instruction unit 213 as a trigger, and performs a synchronization process with the nested set data table 320. The conversion from the naive tree data table 310 to the nested set data table 320 can be realized by, for example, a stack algorithm disclosed in Non Patent Literature 1.

When the synchronization process between the naive tree data table 310 and the nested set data table 320 by the synchronization processing unit 214 is completed, the synchronization completion notification unit 215 transmits a synchronization completion notification to the tree structure data processing device 10.

DB Server

The DB server 30 is a server that stores the naive tree data table 310 and the nested set data table 320 in association with one service. As illustrated in FIG. 1, the DB server 30 is realized by a computer or the like including a control unit 31, an input/output unit 32, and a storage unit 33. The input/output unit 32 is formed by a communication interface that transmits and receives information and an input/output interface that transmits and receives information to and from an input device such as a keyboard or an output device such as a monitor. The storage unit 33 is formed by a flash memory, a hard disk, a RAM, or the like. The storage unit 33 stores the naive tree data table 310 and the nested set data table 320 associated with one service. The storage unit 33 may store a plurality of pairs of naive tree data table 310 and nested set data table 320 associated with a plurality of services.

The control unit 31 is in charge of all the processes of the DB 30, and receives an update request or a read update for the naive tree data table 310 and performs a process or receives a read request or control of a synchronization process on the nested set data table 320 and performs a process. The control unit 31 outputs completion information as response information when a measure to each request or the like is completed.

Flow of Process

Next, a flow of a process performed by the tree structure data processing system 1000 will be described with reference to FIGS. 5 to 9.

Reading Process at Normal Times

Figure 5:
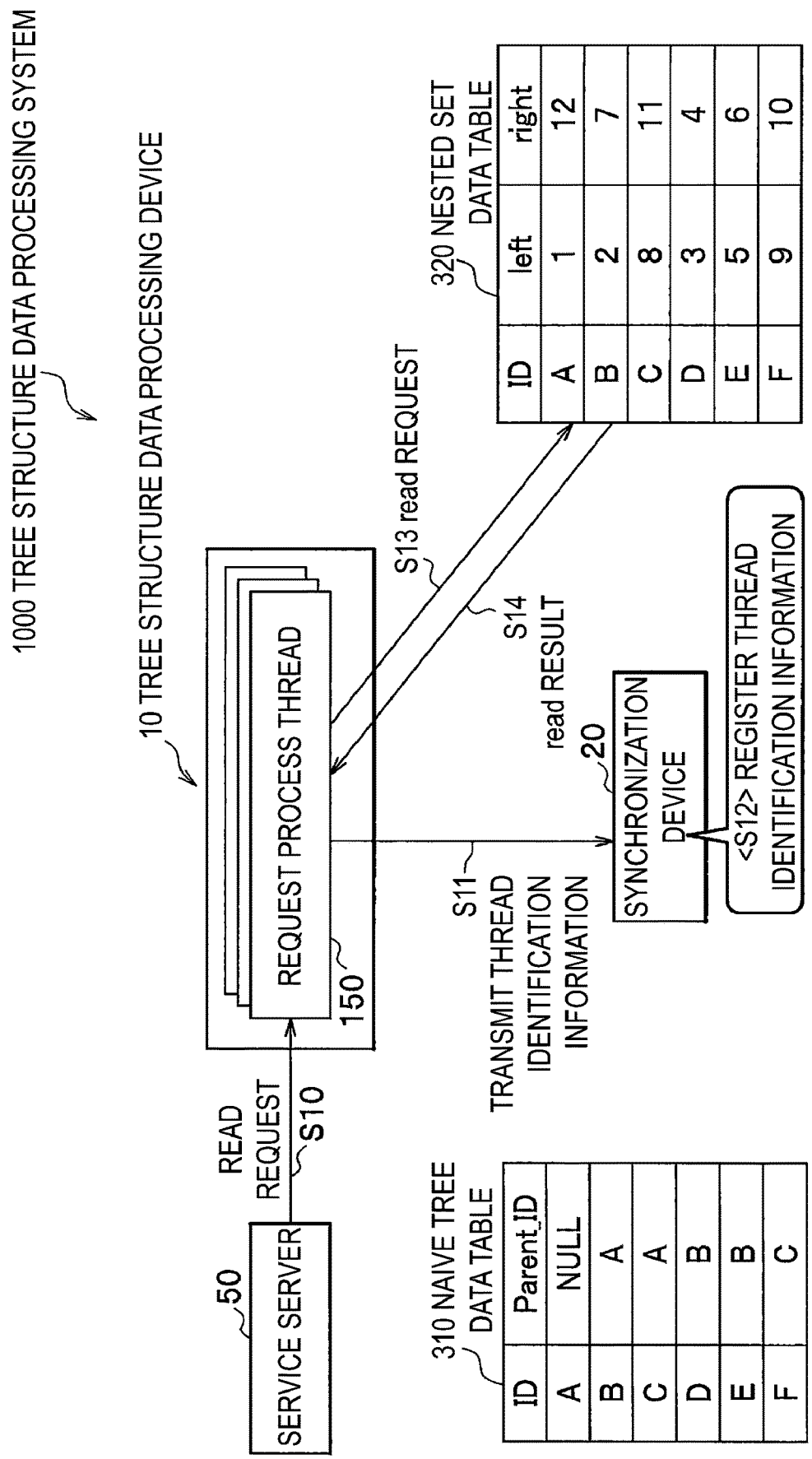
FIG. 5 is a diagram illustrating a read request process at normal times by the tree structure data processing system according to the embodiment.

First, a process for a read request performed at normal times (when the nested set data table 320 is not being synchronized) will be described. FIG. 5 is a diagram illustrating a read request process at normal times by the tree structure data processing system 1000 according to the embodiment. At normal times, the tree structure data processing system 1000 performs the process for the read request with reference to the nested set data table 320.

First, the request reception unit 111 of the tree structure data processing device 10 receives a (abstract) read request as a query from the service server 50 (step S10). Then, the request reception unit 111 outputs the received query (the read request) to the process thread setting unit 112.

Subsequently, the process thread setting unit 112 of the tree structure data processing device 10 starts the request process thread 150 when acquiring the query. Then, the process thread setting unit 112 transmits the identification information (the identifier) of the started request process thread 150 to the synchronization device 20 (step S11). When receiving the identification information of the thread (the request process thread 150), the thread registration unit 211 of the synchronization device 20 registers the identification information by storing the identification information in the storage unit 23 (step S12).

Subsequently, the process thread setting unit 112 of the tree structure data processing device 10 determines request content such as whether the content of the acquired query is the read request or an update request. Then, when the query is determined to be the read request and when the synchronization state management unit 113 does not receive the synchronization waiting instruction information, that is, when the nested set data table 320 is not being synchronized, the process thread setting unit 112 converts the (abstract) read request into a recursive SQL for the nested set in a transaction of the started request process thread 150 and transmits the read request to the nested set data table 320 (step S13). Then, a response (a read result) is received from the DB server 30 (step S14) and the request responding unit 114 of the tree structure data processing device 10 transmits the response (the read result) to the service server 50.

In this way, in the tree structure data processing system 1000, when a data read request is received from the service server 50, data is read from the nested set data table 320 and a response can be transmitted to the service server 50 at normal times. Accordingly, it is possible to further reduce a processing load than in a case in which data is read from the naive tree data table 310.

The transmission (step S11) of the identification information of the request process thread 150 and the registration (step S12) of the identification information in the synchronization device 20, performed by the tree structure data processing device 10 upon receiving the query and initializing the request process thread 150 are not performed only in the case of the query indicating the read request and but also performed even when the query indicates an update request. That is, when the request process thread 150 is started, the processes are performed irrespective of the content of the request. In the following description of FIGS. 6 to 9, the processes of steps S11 and S12 are assumed to be similarly performed although the process of registering the identification information of the request process thread 150 is not illustrated.

Figure 6:
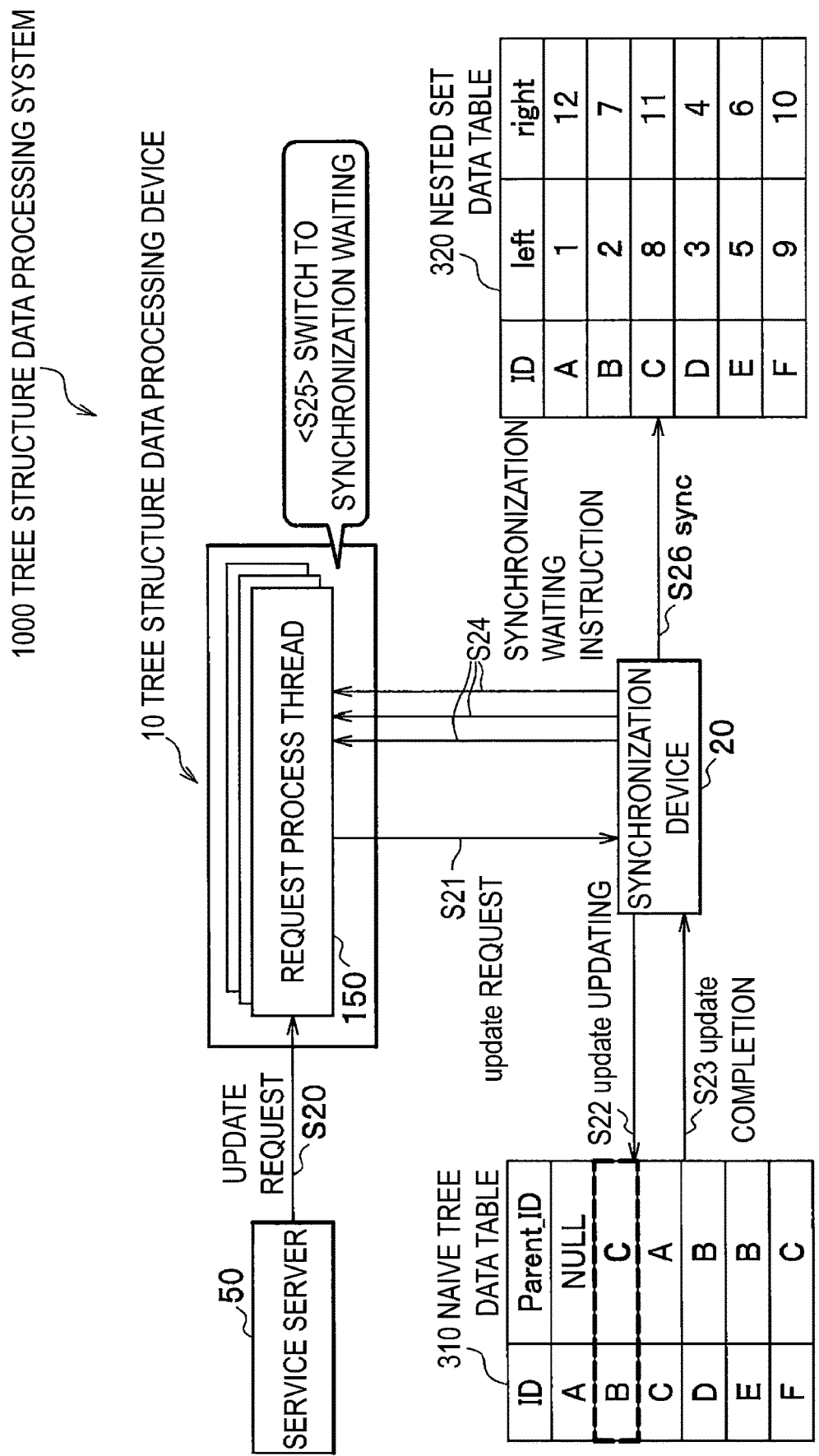
FIG. 6 is a diagram illustrating a data updating process in the tree structure data processing system according to the embodiment.

Data Updating Process Next, a data updating process performed by the tree structure data processing system 1000 will be described. FIG. 6 is a diagram illustrating a data updating process in the tree structure data processing system 1000 according to the embodiment. In the tree structure data processing system 1000, a process for a data update request (update writing (reconfiguration of the tree structure)) is first performed in the naive tree data table 310. Thereafter, a synchronization process with the nested set data table 320 is performed.

First, the request reception unit 111 of the tree structure data processing device 10 receives the (abstract) update request as a query from the service server 50 (step S20). Then, the request reception unit 111 outputs the received query (the update request) to the process thread setting unit 112.

Subsequently, when acquiring the query, the process thread setting unit 112 of the tree structure data processing device 10 starts the request process thread 150 and registers the identification information (identifier) of the request process thread 150 by transmitting the identification information to the synchronization device 20 (not illustrated).

Subsequently, the process thread setting unit 112 of the tree structure data processing device 10 determines request content whether the content of the acquired query is a read request or an update request, and so on. Then, when the process thread setting unit 112 determines that the query is the update request, in a transaction of the started request process thread 150, the process thread setting unit 112 converts the (abstract) update request into the SQL for the naive tree and transmits the update request to the synchronization device 20 (step S21). When the update request is received from the tree structure data processing device 10, the data update instruction unit 212 of the synchronization device 20 allows the data to be updated by transmitting the update instruction (the update updating) to the DB server 30 (see FIG. 1) (step S22).

Subsequently, the synchronization waiting instruction unit 213 of the synchronization device 20 receives information regarding the update completion of the naive tree data table 310 from the DB server 30 (see FIG. 1) (step S23). Then, the synchronization waiting instruction unit 213 generates synchronization waiting instruction information for each request process thread 150 with reference to the identification information (the identifier) of each request process thread 150 registered in the storage unit 23 using the reception of the update completion as a trigger, and transmits the synchronization waiting instruction information to the tree structure data processing device 10 (step S24).

When receiving the synchronization waiting instruction information for each request process thread 150, the synchronization state management unit 113 of the tree structure data processing device 10 switches the states of all the request process threads 150 from "normal" (a state in which the synchronization is not waited) to "synchronization waiting" (step S25).

Subsequently, the synchronization processing unit 214 of the synchronization device 20 reads the naive tree data table 310 in the background and converts the information of the naive tree data table 310 into the information of the nested set data table 320 for synchronization (step S26).

In this way, in the tree structure data processing system 1000, when the data update request is received from the service server 50, the naive tree data table 310 is first updated. Thereafter, the nested set data table 320 can be synchronized in the background. Accordingly, in update writing (reconfiguration of the tree structure) of the data that reconfigures the tree structure, the naive tree data table 310 of which a processing load is less than in the nested set can be processed preferentially.

Reading Process During Data Synchronization

Next, a process for a read request performed during the synchronization process (in "synchronization waiting" switching) of the nested set data table 320 will be described.

Figure 7:
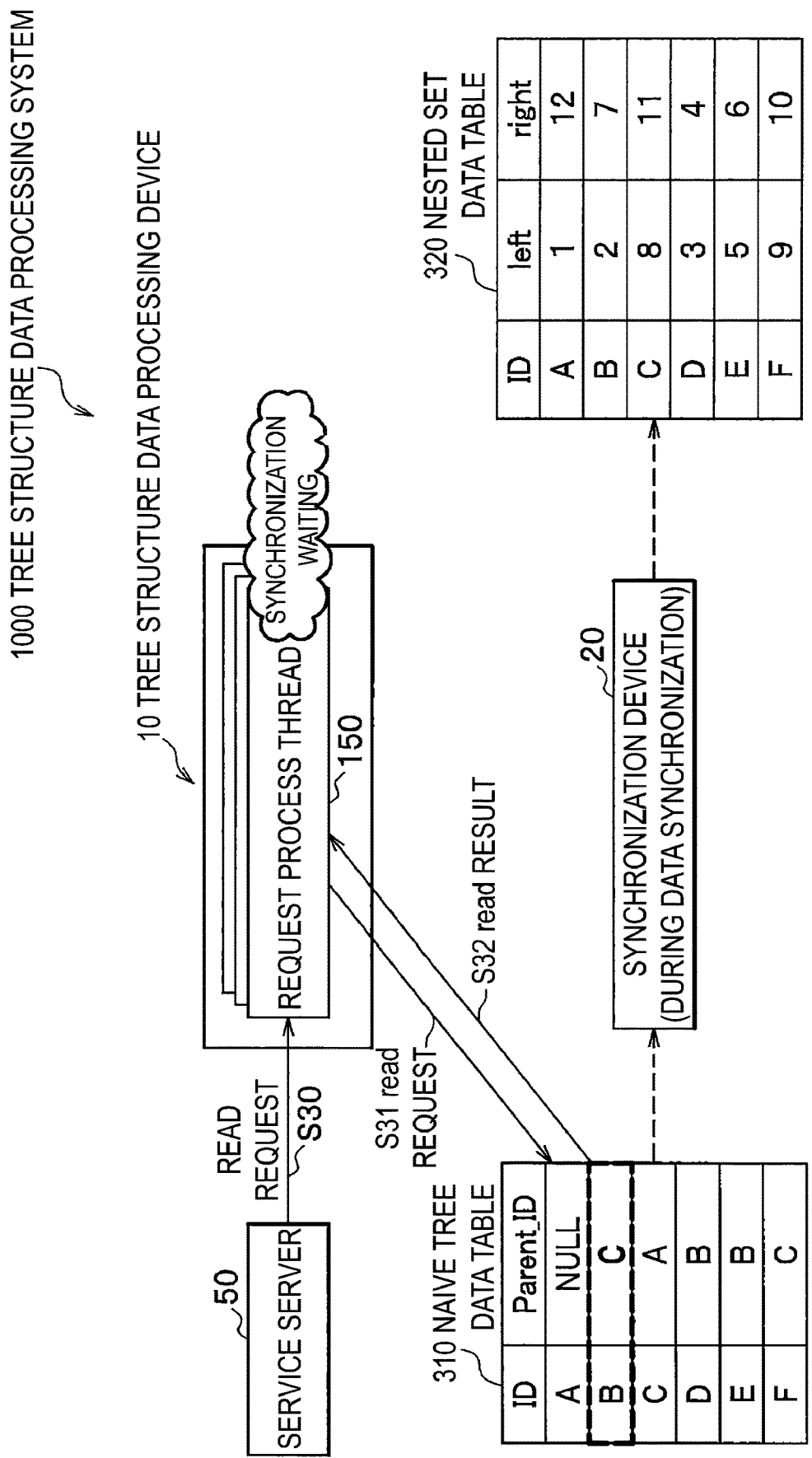
FIG. 7 is a diagram illustrating a read request process in synchronization waiting switching in the tree structure data processing system according to the embodiment.

FIG. 7 is a diagram illustrating a read request process in "synchronization waiting" switching in the tree structure data processing system 1000 according to the embodiment. In FIG. 7, in step S25 of FIG. 6, the state of each request process thread 150 is switched from "normal time" to "synchronization waiting", that is, the nested set data table 320 is being synchronized by the synchronization device 20. In this case, in the tree structure data processing system 1000, the process for the read request is performed with reference to the naive tree data table 310 instead of the nested set data table 320.

First, the request reception unit 111 of the tree structure data processing device 10 receives the (abstract) read request as a query from the service server 50 (step S30). Then, the request reception unit 111 outputs the received query (the read request) to the process thread setting unit 112.

Subsequently, when the query is acquired, the process thread setting unit 112 of the tree structure data processing device 10 starts the request process thread 150 and allows the identification information to be registered by transmitting the identification information (the identifier) of the request process thread 150 to the synchronization device 20 (not illustrated).

Subsequently, the process thread setting unit 112 of the tree structure data processing device 10 determines whether the content of the acquired query is request content such as a read request or an update request. Then, when the process thread setting unit 112 determines that the query is the read request and when each request process thread 150 is in the state of "synchronization waiting", the process thread setting unit 112 converts the (abstract) read request into the recursive SQL for the naive tree and transmits the read request to the naive tree data table 310 in a transaction of the started request process thread 150 (step S31). Then, a response (a read result) is received from the DB server 30 (see FIG. 1) (step S32), and the request responding unit 114 of the tree structure data processing device 10 transmits the response (the read result) to the service server 50.

In this way, in the tree structure data processing system 1000, in the synchronization waiting of the nested set data table 320, the read result can be obtained with reference to the naive tree data table 310 instead of the nested set data table 320. Accordingly, it is possible to reduce a service response-disabled time by an update lock.

Process in Data Synchronization Completion

Figure 8:
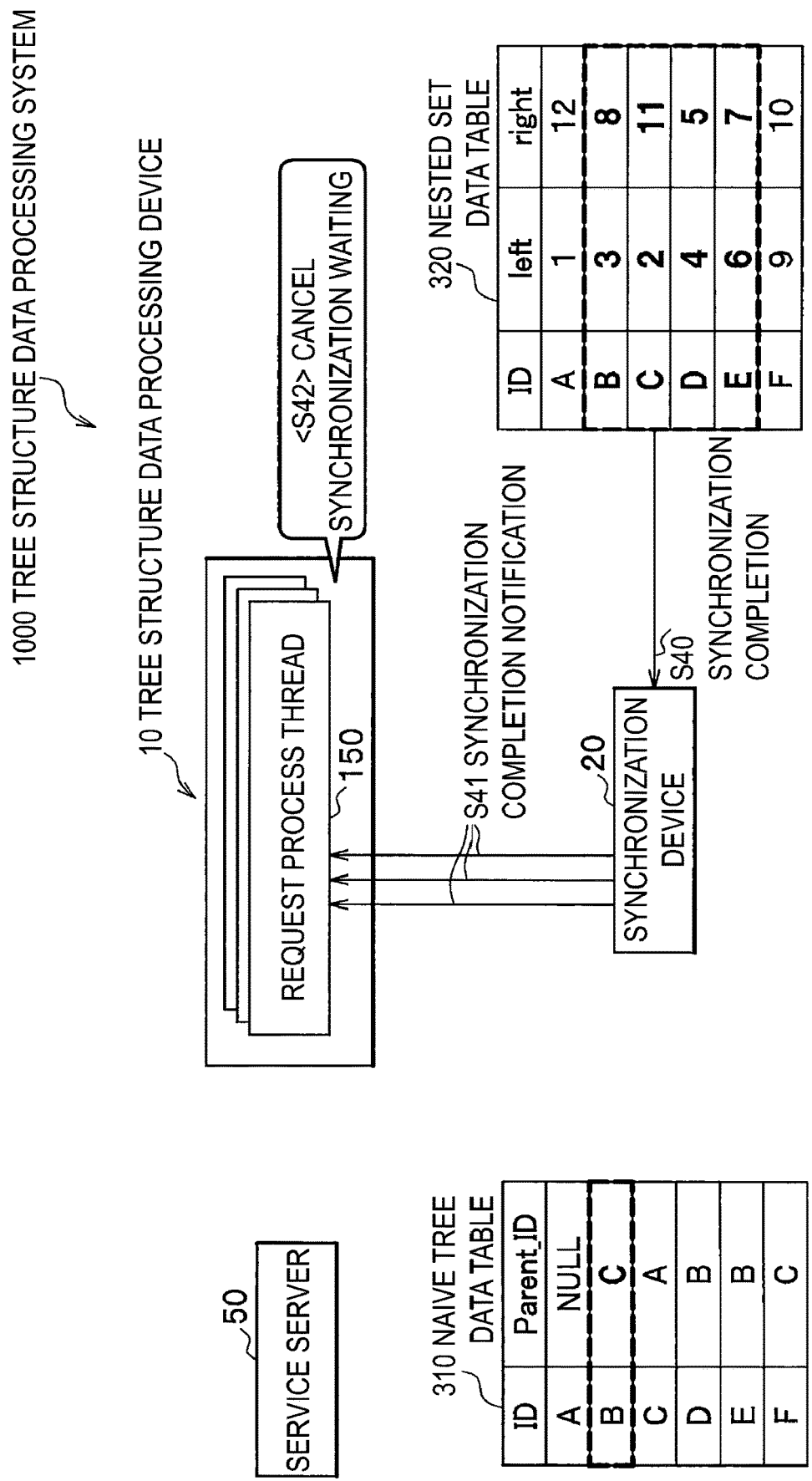
FIG. 8 is a diagram illustrating a process in synchronization completion in the tree structure data processing system according to the embodiment.

Next, a process in the synchronization completion of the nested set data table 320 will be described. FIG. 8 is a diagram illustrating a process in synchronization completion in the tree structure data processing system 1000 according to the embodiment.

When the synchronization process for the nested set data table 320 is completed, the synchronization device 20 receives result information of the synchronization completion from the DB server 30 (see FIG. 1) (step S40). Then, when the result information of the synchronization completion is received, the synchronization completion notification unit 215 of the synchronization device 20 generates synchronization completion notification indicating cancellation of the synchronization waiting for each request process thread 150 with reference to the identification information (the identifier) of each request process thread 150 registered in the storage unit 23 and transmits the synchronization completion notification to the tree structure data processing device 10 (step S41).

When receiving the synchronization completion notification for each request process thread 150, the synchronization state management unit 113 of the tree structure data processing device 10 cancels the state of "synchronization waiting" by switching the states of all the request process threads 150 from "synchronization waiting" to "normal" (step S42).

In this way, in the tree structure data processing system 1000, when the synchronization process of the nested set data table 320 is completed, the state of each request process thread 150 can be switched from "synchronization waiting" to "normal".

Data Updating Process during Data Synchronization

Figure 9:
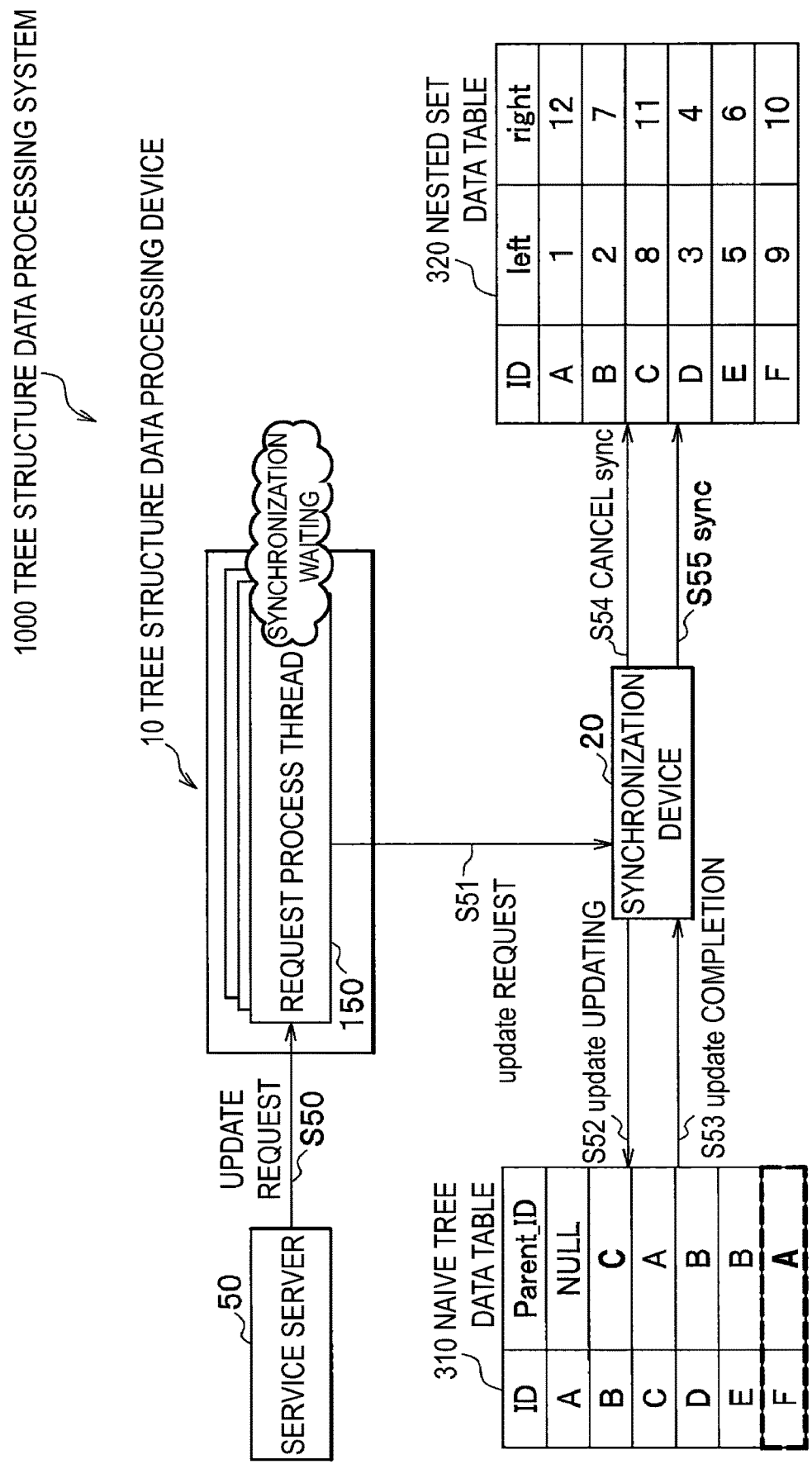
FIG. 9 is a diagram illustrating a data updating process during data synchronization in the tree structure data processing system according to the embodiment.
Figure 10:
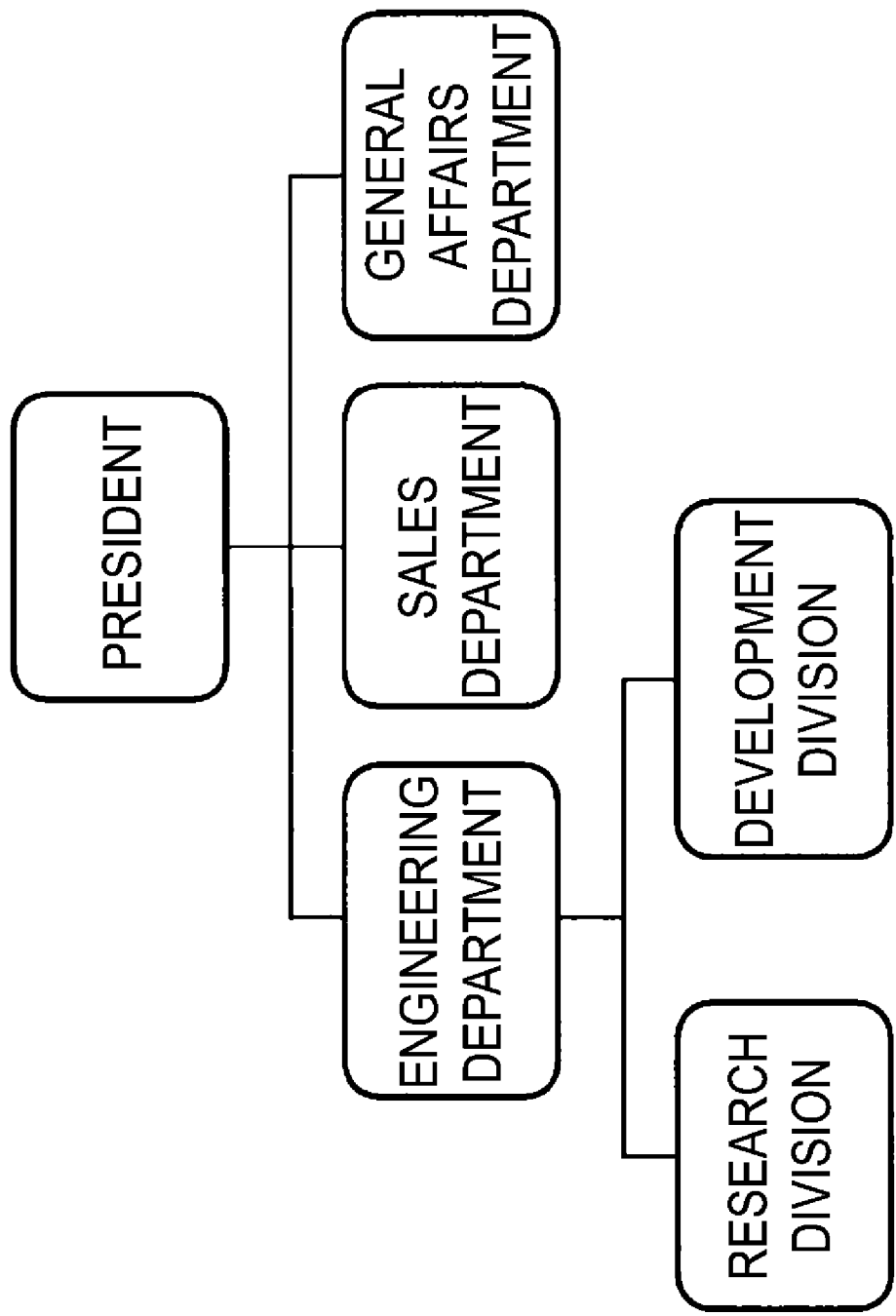
FIG. 10 is a diagram illustrating a data example (an organization structure of a company) of a tree structure.
Figure 11:
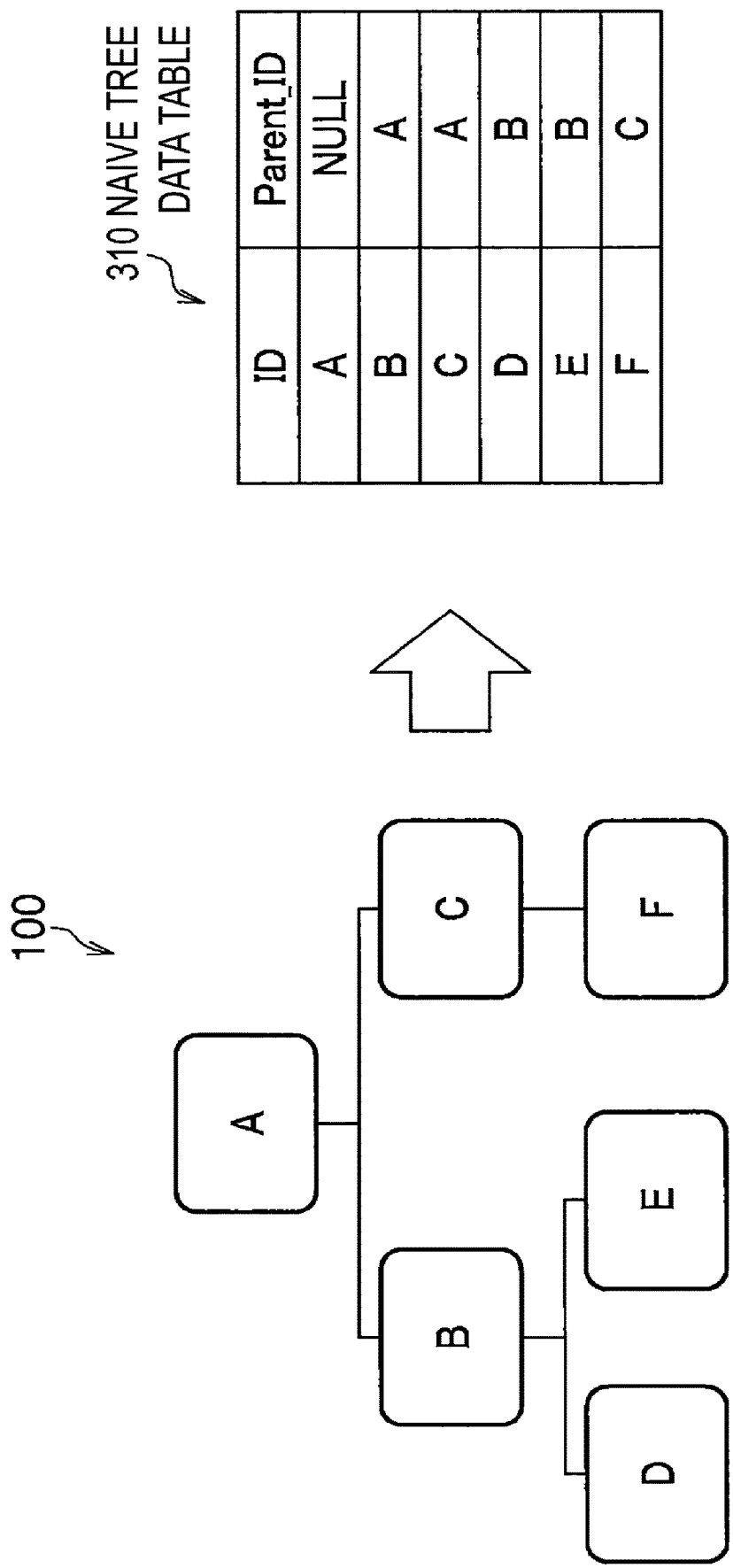
FIG. 11 is a diagram illustrating a naive tree data table.
Figure 12:
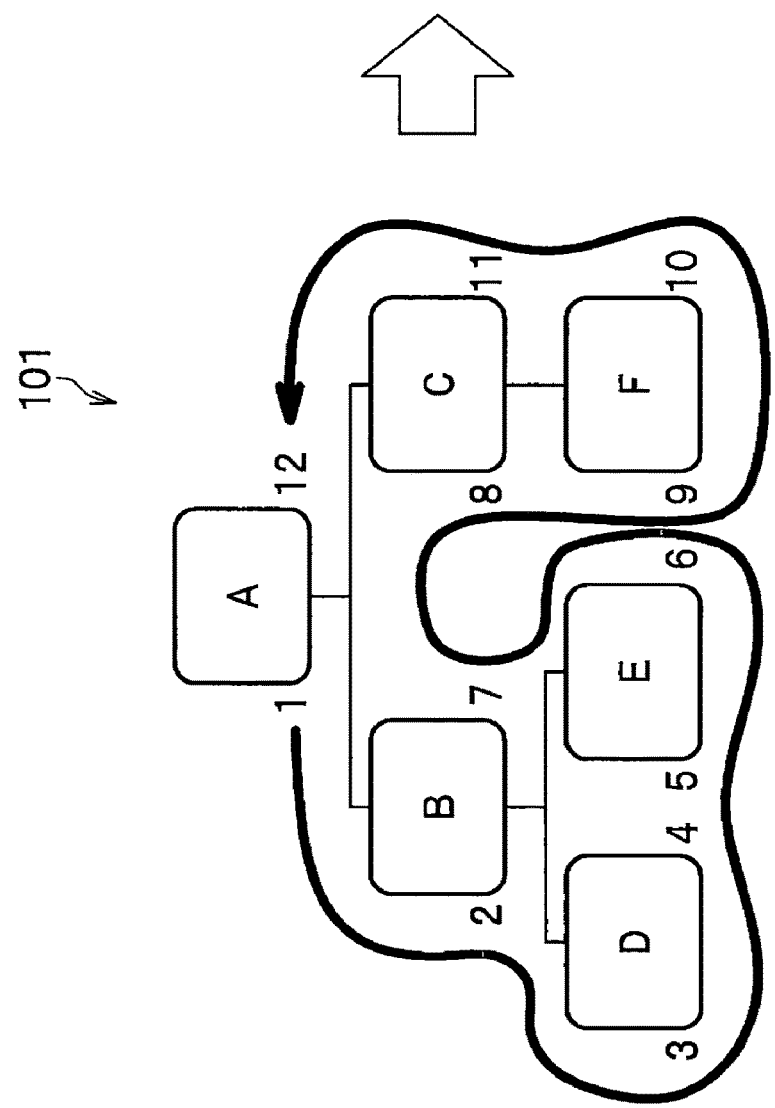
FIG. 12 is a diagram illustrating a nested set data table.
Figure 13:
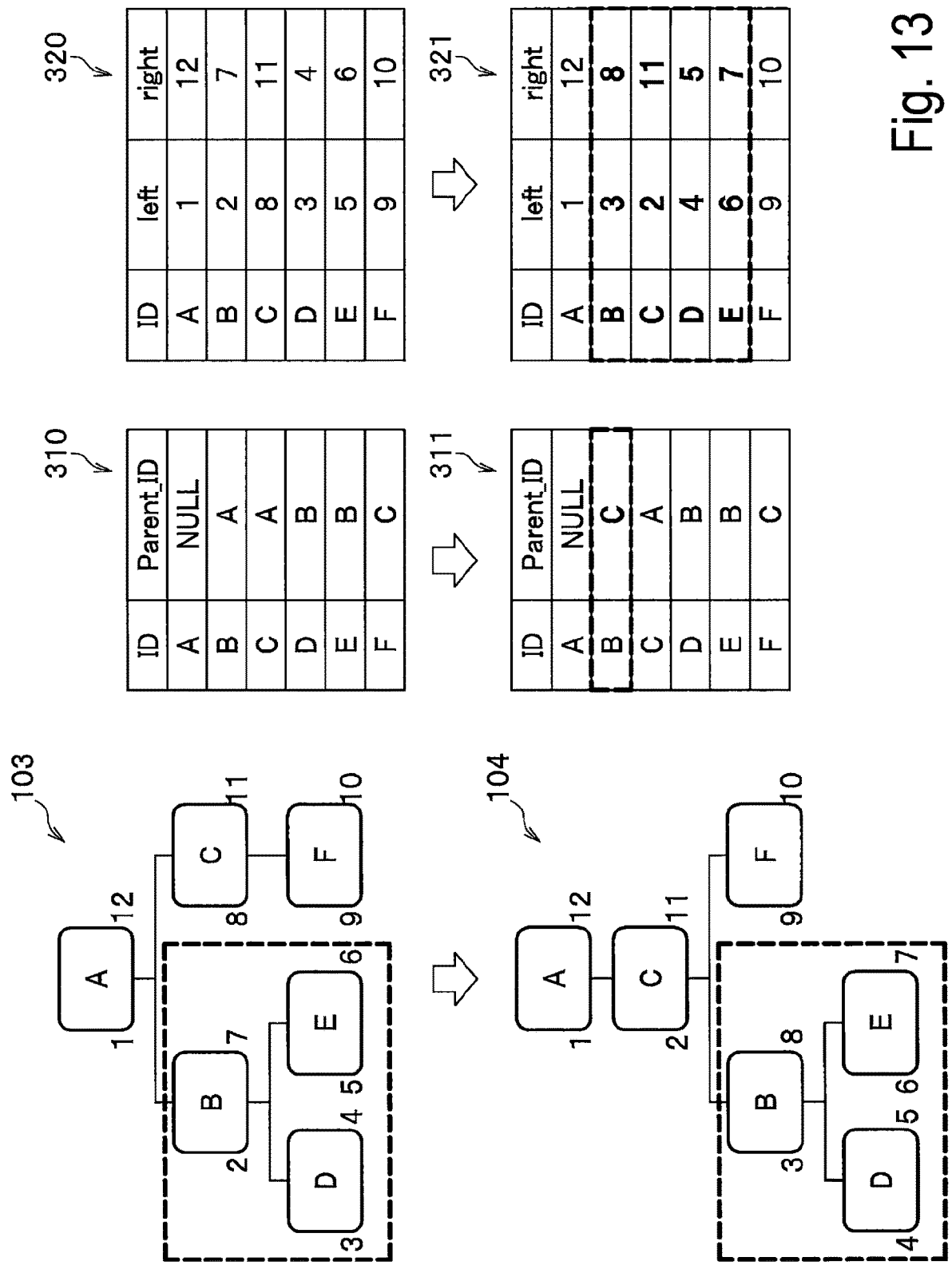
FIG. 13 is a diagram illustrating problems when the naive tree data table and the nested set data table are used.

Next, a process when the tree structure data processing system 1000 further receives a data update request (update writing (reconfiguration of the tree structure)) for the same data table during data synchronization will be described. FIG. 9 is a diagram illustrating a data updating process during the data synchronization in the tree structure data processing system 1000 according to the embodiment. In the tree structure data processing system 1000, when the update request is further received during the synchronization process for the nested set data table 320 by the synchronization device 20, the synchronization device 20 cancels the immediately previous synchronization process and performs the synchronization process using the updated latest data again.

First, the request reception unit 111 of the tree structure data processing device 10 receives the (abstract) update request as a query from the service server 50 (step S50). Then, the request reception unit 111 outputs the received query (the update request) to the process thread setting unit 112.

Subsequently, when the query is acquired, the process thread setting unit 112 of the tree structure data processing device 10 starts the request process thread 150 and allows the identification information to be registered by transmitting the identification information (the identifier) of the request process thread 150 to the synchronization device 20 (not illustrated).

Subsequently, the process thread setting unit 112 of the tree structure data processing device 10 determines request content such as whether the content of the acquired query is a read request or an update request. Then, when the process thread setting unit 112 determines that the query is the update request, the process thread setting unit 112 converts the (abstract) update request into the SQL for the naive tree and transmits the update request to the synchronization device 20 in a transaction of the started request process thread 150 (step S51). When the update request is received from the tree structure data processing device 10, the data update instruction unit 212 of the synchronization device 20 allows the data to be updated by transmitting the update instruction (update updating) to the DB server 30 (see FIG. 1) (step S52).

Subsequently, the synchronization waiting instruction unit 213 of the synchronization device 20 receives information regarding the update completion of the naive tree data table 310 from the DB server 30 (see FIG. 1) (step S53).

Subsequently, the synchronization processing unit 214 of the synchronization device 20 cancels the (immediately previous) synchronization process performed at the present time (step S54). Then, the synchronization processing unit 214 reads the latest naive tree data table 310 again and converts the information of the naive tree data table 310 into the information of the nested set data table 320 for synchronization (sync) (step S55).

In this way, in the tree structure data processing system 1000, when further receiving the update request (update writing (reconfiguration of the tree structure)) of the data for the same data table during the data synchronization, the immediately previous synchronization process is canceled, and then the nested set data table 320 can be synchronized based on the data of the latest naive tree data table 310.

Synchronization Waiting Process During Transaction

Next, a synchronization waiting switching process performed during a transaction of a certain request process thread 150 and caused by a transaction of another request process thread 150 started by the tree structure data processing device 10 of the tree structure data processing system 1000 will be described. In this case, a process becomes different in accordance with height of a separation level of a transaction set in advance in the DB server 30 (see FIG. 1). Here, for example, in the following description, when a reading process from the nested set data table 320 is performed, as illustrated in FIG. 5, in a transaction of the request process thread 150, a synchronization waiting switching process is performed due to another transaction process. When a high transaction separation level is set in the DB server 30, data is repeatedly read from a snapshot of the data table (the nested set data table 320) in start of the transaction. Therefore, the synchronization waiting switching process is not reflected in the transaction. Conversely, when a low transaction separation level is set in the DB server 30, the synchronization waiting switching process is immediately reflected even during the process of the transaction.

Specifically, when the transaction has already started in the request process thread 150 which is being processed and a high transaction separation level is set in the DB server 30, the data is continuously read from the snapshot in the start of the transaction (REPEATABLE_READ). Therefore, even when the tree structure data processing device 10 performs the synchronization waiting switching process, the reading process from the nested set data table 320 continues and is not switched to the reading process from the naive tree data table 310. Accordingly, in the high transaction separation level, consistency of the data during the transaction is guaranteed. Instead, because a change in the data at the present time is not reflected, a failure of the process of the transaction easily occurs as a result.

On the other hand, when the transaction has already started in the request process thread 150 which is being processed and a low transaction separation level is set in the DB server 30, it is necessary to read the change reflected in the data immediately even during the transaction. Therefore, when the tree structure data processing device 10 performs the synchronization waiting switching process, the reading from the nested set data table 320 is stopped and the switching is performed so that the data is read from the updated naive tree data table 310. Accordingly, in the low transaction separation level, the consistency of the data of the transaction is not guaranteed. Instead, because the change in the data at the present time is reflected, the process of the transaction easily succeeds as a result.

When the transaction has not yet started in the request process thread 150 which is being processed, the reading process from the naive tree data table 310 is performed irrespective of the transaction separation level.

When the synchronization waiting process is canceled because of a transaction of another request process thread 150 during a transaction of a certain request process thread 150 started by the tree structure data processing device 10 of the tree structure data processing system 1000, as illustrated in FIG. 7, the process for the read request performed with reference to the naive tree data table 310 is switched so that the data is read from the nested set data table 320 irrespective of the separation level of the transaction. This is because the synchronization between the naive tree data table 310 and the nested set data table 320 is completed, and therefore the consistency of the data is guaranteed and it is advantageous to use the nested set data table 320 of which a processing load is less.

As described above, in the tree structure data processing system 1000, the tree structure data processing method, the tree structure data processing device 10, and the tree structure data processing program according to the embodiment, it is possible to reduce a service response-disabled time by an update lock and maintain data searching and reading performance without deterioration in reconfiguration of the tree structure in the relational database.

REFERENCE SIGNS LIST

10 Tree structure data processing device
11, 21, 31 Control unit
12, 22, 32 Input/output unit
13, 23, 33 Storage unit
20 Synchronization device
30 DB server
50 Service server
111 Request reception unit
112 Process thread setting unit
113 Synchronization state management unit
114 Request responding unit
150 Request process thread
211 Thread registration unit
212 Data update instruction unit
213 Synchronization waiting instruction unit
214 Synchronization processing unit
215 Synchronization completion notification unit
310 Naive tree data table
320 Nested set data table
1000 Tree structure data processing system

The invention claimed is:

1. A tree structure data processing system, comprising:
a DB server configured to store, in a data table, tree structure data in a relational database;
a tree structure data processing device configured to control updating and retrieving the tree structure data; and
a synchronization device configured to synchronize a plurality of the data tables stored in the DB server with each other,
wherein the DB server includes a storage unit configured to store, as data tables for one service,
a naive tree data table indicating a data table obtained by modeling the tree structure data in conformity with a naive tree scheme, and
a nested set data table indicating a data table obtained by modeling the tree structure data in conformity with a nested set scheme, in association with each other,
the tree structure data processing device includes
a request reception unit, including one or more processors, configured to receive an update request and a retrieval request for the tree structure data,
a process thread setting unit, including one or more processors, configured to start and perform a request process thread for retrieval processing with reference to the nested set data table when the retrieval request is received, and start and perform a request process thread for updating data of the naive tree data table when the update request is received, and a synchronization state management unit, including one or more processors, configured to switch a state of the request process thread to a synchronization waiting state when synchronization waiting instruction information indicating start of a synchronization process between the naive tree data table and the nested set data table is received, the synchronization device includes
- a synchronization waiting instruction unit, including one or more processors, configured to transmit the synchronization waiting instruction information to the tree structure data processing device when information indicating update completion of the naive tree data table is received from the DB server, and
- a synchronization processing unit, including one or more processors, configured to convert data of the naive tree data table updated in response to the update request into data of the nested set data table to perform synchronization, and in the tree structure data processing device,
during the retrieval processing with reference to the nested set data table is being performed for the retrieval request, receive the synchronization waiting instruction information, the process thread setting unit is configured to:
determine whether the retrieval request is a transaction with i) a high separation level that does not require switching the state of the retrieval request to the synchronization waiting state in response to receiving the synchronization waiting instruction information or ii) a low separation level that requires switching the state of the retrieval request to the synchronization waiting state in response to receiving the synchronization waiting instruction information,
in response to determining that the retrieval request is a transaction with a high separation level, continue the retrieval processing with reference to a snapshot of the nested set data table in start of the transaction, and
in response to determining that the retrieval request is a transaction with a low separation level, stop the retrieval processing from the nested set data table and perform a retrieval process with reference to the naive tree data table.

2. A tree structure data processing method of a tree structure data processing system including
- a DB server that is configured to store, in a data table, tree structure data in a relational database,
- a tree structure data processing device that is configured to control updating and retrieving the tree structure data, and
- a synchronization device that is configured to synchronize a plurality of the data tables stored in the DB server with each other, wherein, as part of the tree structure data processing method, the DB server stores, as a data table for one service,
- a naive tree data table indicating a data table obtained by modeling the tree structure data in conformity with a naive tree scheme, and
- a nested set data table indicating a data table obtained by modeling the tree structure data in conformity with a nested set scheme, in association with each other, wherein, as part of the tree structure data processing method, the tree structure data processing device performs receiving an update request and a retrieval request for the tree structure data,
starting and performing a request process thread for retrieval processing with reference to the nested set data table when the retrieval request is received, and starting and performing a request process thread for updating data of the naive tree data table when the update request is received, and
switching a state of the request process thread to a synchronization waiting state when synchronization waiting instruction information indicating start of a synchronization process between the naive tree data table and the nested set data table is received, wherein, as part of the tree structure data processing method, the synchronization device performs
transmitting the synchronization waiting instruction information to the tree structure data processing device when information indicating update completion of the naive tree data table is received from the DB server, and
converting data of the naive tree data table updated in response to the update request into data of the nested set data table to perform synchronization, and wherein, as part of the tree structure data processing method, the tree structure data processing device performs
during the retrieval processing with reference to the nested set data table is being performed for the retrieval request, receiving the synchronization waiting instruction information,
determining whether the retrieval request is a transaction with i) a high separation level that does not require switching the state of the retrieval request to the synchronization waiting state in response to receiving the synchronization waiting instruction information or ii) a low separation level that requires switching the state of the retrieval request to the synchronization waiting state in response to receiving the synchronization waiting instruction information,
in response to determining that the retrieval request is a transaction with a high separation level, continuing the retrieval processing with reference to a snapshot of the nested set data table in start of the transaction, and
in response to determining that the retrieval request is a transaction with a low separation level, stopping the retrieval processing from the nested set data table and performing a retrieval process with reference to the naive tree data table.

3. A tree structure data processing device which is communicatively connected to a DB server configured to store, in a data table, tree structure data in a relational database and a synchronization device configured to synchronize a plurality of the data tables stored in the DB server, the tree structure data processing device configured to control updating and retrieving the tree structure data, wherein the DB server is configured to store, as a data table for one service,
a naive tree data table indicating a data table obtained by modeling the tree structure data in conformity with a naive tree scheme, and a nested set data table indicating a data table obtained by modeling the tree structure data in conformity with a nested set scheme, in association with each other, the tree structure data processing device includes
a request reception unit, including one or more processors, configured to receive an update request and a retrieval request for the tree structure data, a process thread setting unit, including one or more processors, configured to start and perform a request process thread for retrieval processing with reference to the nested set data table when the retrieval request is received, and start and perform a request process thread for updating data of the naive tree data table when the update request is received, and a synchronization state management unit, including one or more processors, configured to switch a state of the request process thread to a synchronization waiting state when synchronization waiting instruction information indicating start of a synchronization process between the naive tree data table and the nested set data table is received from the synchronization device, and in the tree structure data processing device, during the retrieval processing with reference to the nested set data table is being performed for the retrieval request, receive the synchronization waiting instruction information, the process thread setting unit is configured to:

determine whether the retrieval request is a transaction with i) a high separation level that does not require switching the state of the retrieval request to the synchronization waiting state in response to receiving the synchronization waiting instruction information or ii) a low separation level that requires switching the state of the retrieval request to the synchronization waiting state in response to receiving the synchronization waiting instruction information, in response to determining that the retrieval request is a transaction with a high separation level, continue the retrieval processing with reference to a snapshot of the nested set data table in start of the transaction, and in response to determining that the retrieval request is a transaction with a low separation level, stop the retrieval processing from the nested set data table and perform a retrieval process with reference to the naive tree data table.

4. A non-transitory computer readable medium storing one or more instructions causing a computer to operate as the tree structure data processing device according to claim 3.

* * * * *